July 8, 1930.   D. W. VOORHEES, JR   1,770,223
WAGON BOX AND METHOD OF PRODUCING SAME
Filed March 29, 1930   2 Sheets-Sheet 2
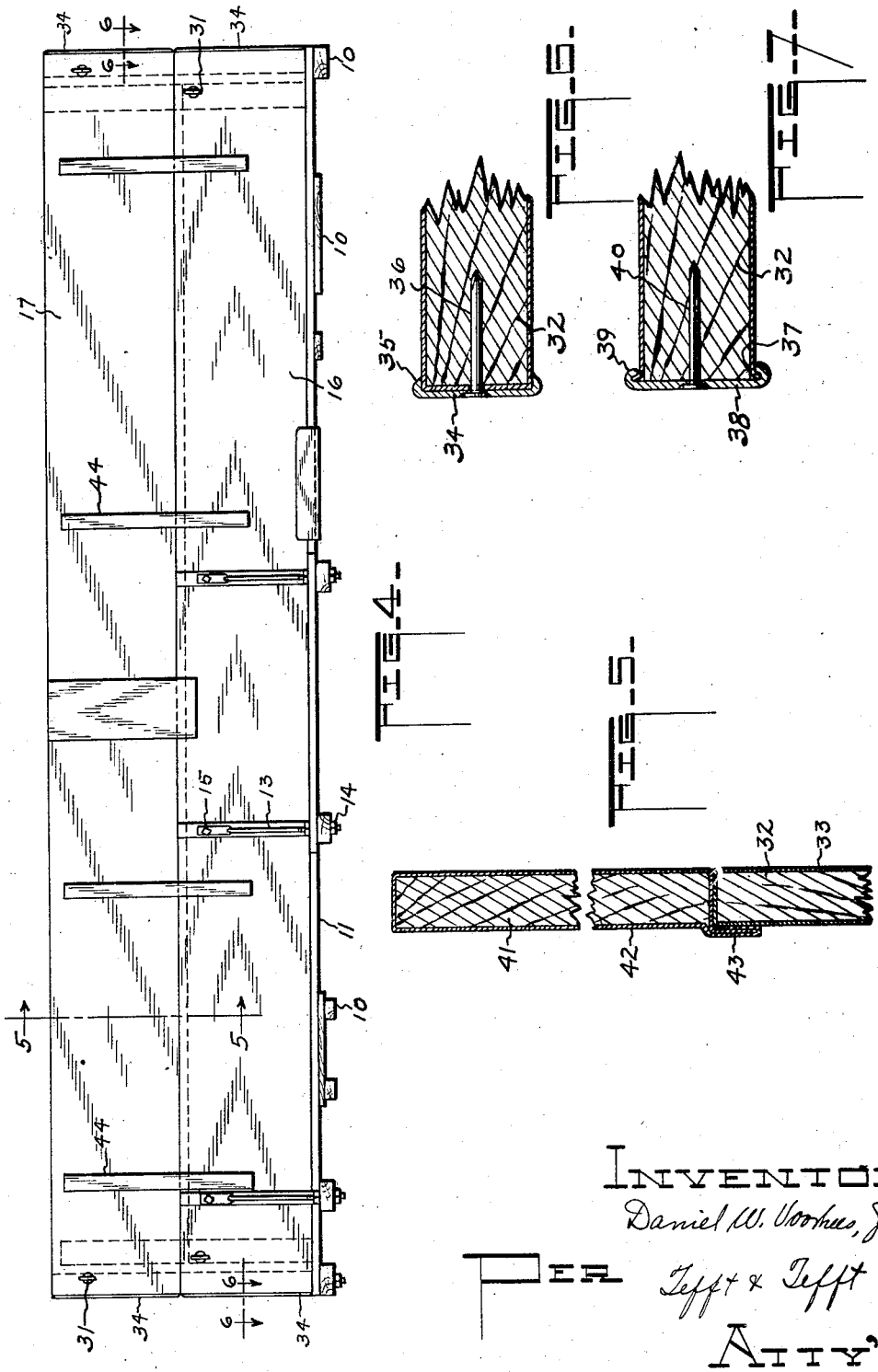

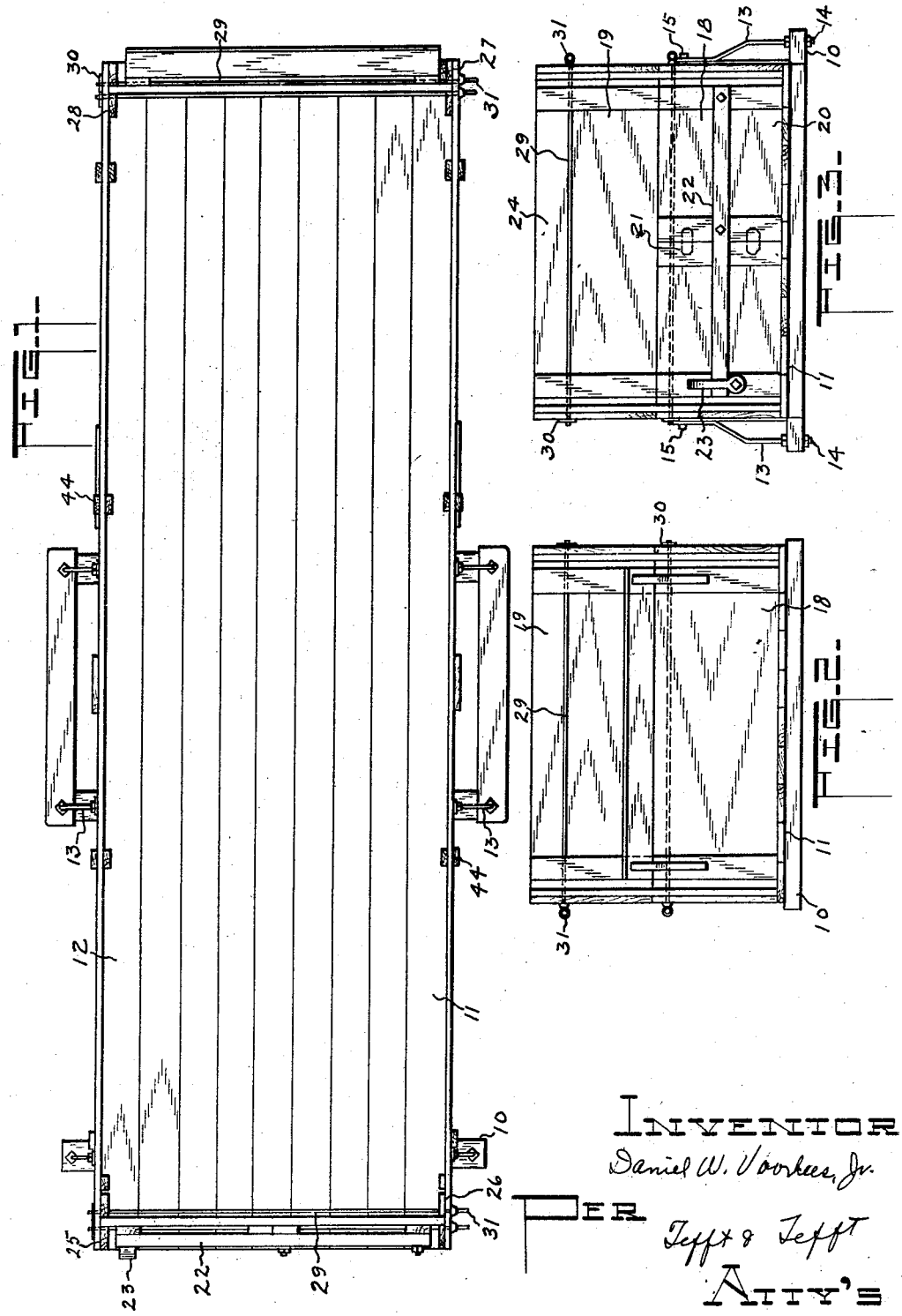

Patented July 8, 1930

1,770,223

UNITED STATES PATENT OFFICE

DANIEL W. VOORHEES, JR., OF PERU, ILLINOIS

WAGON BOX AND METHOD OF PRODUCING SAME

Application filed March 29, 1930. Serial No. 439,919.

This invention relates to wagon boxes, as well as to the method of constructing same.

One of the objects of the invention lies in the provision of a wagon box formed with a wooden bottom and side and end portions formed of wood, the wood, however, being entirely enclosed in rustproof metal.

Another object lies in the provision of a wagon box having a wooden bottom portion and side and end walls formed by surrounding wooden sections completely with metal, the metal covering being so arranged as to afford a relatively adjustable and removable connection between the wall sections.

Other objects will appear in the following specification taken in connection with the annexed drawings, in which—

Fig. 1 is a plan view of my wagon box;
Fig. 2 is a front elevation thereof;
Fig. 3 is a rear elevation;
Fig. 4 is a side elevation of the wagon box;
Fig. 5 is a sectional view taken on the line 5—5 of Fig. 4;
Fig. 6 is a sectional view taken on the line 6—6 of Fig. 4; and
Fig. 7 is a detail showing of another manner of attaching the auxiliary strip to the ends of the wagon box sides.

Applicant has been experimenting for some considerable time with wagon boxes and endeavoring to increase the strength and length of life of the wagon box, as well as to produce same in a manner that will materially reduce the manufacturing cost and therefore permit the product to be sold to the public at a lower price.

Applicant discloses herein a structure which represents the completion of experimental work on wagon boxes, which structure conforms generally in shape and appearance, as far as the wagon is concerned, to the conventional wagon. However, this wagon box is constructed, as will hereinafter be shown, in an entirely novel manner with consequent results of increased strength, longevity and appearance and at the same time at a reduced cost.

Referring specifically to the drawings, there is shown merely the wagon box itself without the conventional bolster mechanism, which of course is conventional in design and may obviously be made either of wood or steel.

A plurality of underneath supporting members 10 are shown, upon which the bottom 11 of the wagon is adapted to rest. The bottom of the wagon is shown in a conventional manner with the plurality of removable portions 12. Projecting upwardly from the underlying supporting members are a series of metal cleats 13 the same being secured as at 14 to the previously described underneath supports as well as at 15 at their upper ends to the sides of the wagon box. The sides of the wagon box comprise the lowermost fixed portions 16 and the removable upper portions 17. Similarly, the forward part of the wagon comprises a fixed lower end 18 and a removable upper end 19. As respects the end gate of the wagon, this comprises an end gate 20 having a central pivot 21 and conventional horizontally disposed bar 22 and pivoted latch 23. Above the pivoted end gate is a removable upper end portion 24. Upon the interior surface of the side portions of the box at points adjacent the ends thereof are disposed vertically extending cleats 25 and 26, and 27 and 28 respectively, these cleats being formed to receive the end portions of the wagon therein in a slidable and removable relationship.

Additional means tying the various portions of the wagon box together is provided in the plurality of transversely disposed metal rods 29 which are provided with abutment members 30 at one end and with adjustable wing nuts 31 upon their opposite ends.

Applicant now desires to call particular attention to the formation of the side and end sections of the wagon box. In Fig. 5 it is shown that both the fixed and lower side portions of the wagon, as well as the adjustable and removable upper side portion, has an interior core of wood, the same being designated 32. Surrounding the wood core 32 in a manner to completely enclose same is a rustproof metal covering 33. This manner of covering the wood is accomplished by certain machines which shape the metal exactly to conform with the wood core and to overlap the remaining edges in such manner that they may either be nailed, welded or seamed in a satisfactory manner as the case may be. As a matter of fact, in Fig. 6 there is shown an additional means 34 for covering the ends of the side sections, this means comprising a metal strip overlapping in a manner shown at 35, the final connecting means with the wood core being accomplished by means of the nails or screws 36.

Referring to Fig. 7, there is shown therein a modification of the manner of attaching the auxiliary strips to the wagon box sides. In this instance, the metal enclosing the wooden sides has an outwardly flared flange 37 upon which is adapted to be secured in a vertically slidable manner, the auxiliary metal strip 38 having its outer ends inturned as at 39 to tightly engage the outturned portions 37. In this instance also, it may be advisable to use the nails or screws 40 to finally secure the strip to the ends of the wagon sides.

Again referring to Fig. 5, the upper section of the wagon box and the portion relatively movable with relation to the fixed portion of the wagon box, is formed generally in a similar manner. However, the wood core 41 in this instance is not only entirely enclosed by the metal 42, but the connection between the ends of the metal is made in such manner that an offset lip portion 43 is formed, said lip engaging the interior upper edge of the lower side portions. Such fashioning of the opposed edges of the metal 42 surrounding the upper section provides a main portion of the mechanism which permits removability of the upper wagon box side. Additional means for accomplishing this attachment as well as the removal feature is provided in the exterior plural cleat members 44 which are provided on the outer side of the upper section. It is obvious that by such formation of a wooden cleat on the outside and the downwardly projecting inner metal lip of the upper section that the upper wagon box side may be raised or lowered manually to a fixed position with respect to the lower side.

As respects the method of producing applicant's wagon, it would seem obvious from the above description that the bottom of the wagon may be formed and produced in the conventional manner and that the side and end sections of the wagon box are first entirely covered with a rustproof metal, thereby insuring the inner wooden core against deterioration caused by subjection to the elements and finally the assembly of the various cleats and attachment means to complete the wagon assembly.

What I claim is:

1. A grain wagon having side and end walls formed by a fibrous core completely covered by metal sheathing, removable side and end portions detachably connected to the side and end walls for optionally increasing the height of the wagon, said portions being also formed by a fibrous core completely covered by metal sheathing, and a lip portion overlapping the joint between the side walls and the associated removable portion for forming a grain seal.

2. A grain wagon having side and end walls formed by a fibrous core completely covered by metal sheathing, removable side and end portions detachably connected to the side and end walls for optionally increasing the height of the wagon, said portions being also formed by a fibrous core completely covered by metal sheathing, and a lip formed as a part of the metal sheathing connected to one of the side walls and engaging the adjacent removable portion to form a grain seal between the joint therein.

In testimony whereof I have hereunto affixed my signature.

DANIEL W. VOORHEES, Jr.